United States Patent [19]

Lam

[11] Patent Number: 4,839,765
[45] Date of Patent: Jun. 13, 1989

[54] MAGNETIC RECORDING DISKETTE WITH OFFSET WIPING FABRIC

[75] Inventor: Hung Q. Lam, Yukon, Okla.

[73] Assignee: Minnesota Mining and Manufacturing Company, St. Paul, Minn.

[21] Appl. No.: 831,839

[22] Filed: Feb. 24, 1986

[51] Int. Cl.[4] .............................................. G11B 23/03
[52] U.S. Cl. ...................................................... 360/133
[58] Field of Search ................ 360/133; 206/444, 312, 206/313; 369/291, 272

[56] References Cited

U.S. PATENT DOCUMENTS

| | | | |
|---|---|---|---|
| 3,668,658 | 6/1972 | Flores et al. | 340/174.1 C |
| 4,239,828 | 12/1980 | Knope et al. | 428/64 |
| 4,263,634 | 4/1981 | Chenoweth et al. | 360/133 |

FOREIGN PATENT DOCUMENTS

| | | | |
|---|---|---|---|
| 0020374 | 2/1985 | Japan | 360/133 |
| 0179975 | 9/1985 | Japan | 206/313 |

Primary Examiner—Robert S. Tupper
Assistant Examiner—Andrew L. Sniezek
Attorney, Agent, or Firm—Donald M. Sell; Walter N. Kirn; Warren R. Bovee

[57] ABSTRACT

Prior magnetic recording diskettes have a wiping fabric, edges of which register with edges of jacket openings, thus involving a hazard of loose fibers. In the novel diskette, the edges of the wiping fabric are out of registry with the edges of the jacket openings. This not only avoids the hazard of loose fibers, but a die with which the jacket is cut remains usefully sharp for at least twice as long as it would if used to die-cut a composite of the jacket material and fabric as in the prior art. Also, the punched-out pieces of jacket material are uncontaminated by fabric and so can be reused as scrap. Preferably, the wiping fabric is separated along the line at which the jacket blank is centrally folded to form an envelope for a recording disk. By eliminating fabric at the central jacket fold, surprisingly lower temperature has been necessary to form the fold, thus eliminating distortions in the jacket at the central fold.

3 Claims, 4 Drawing Sheets

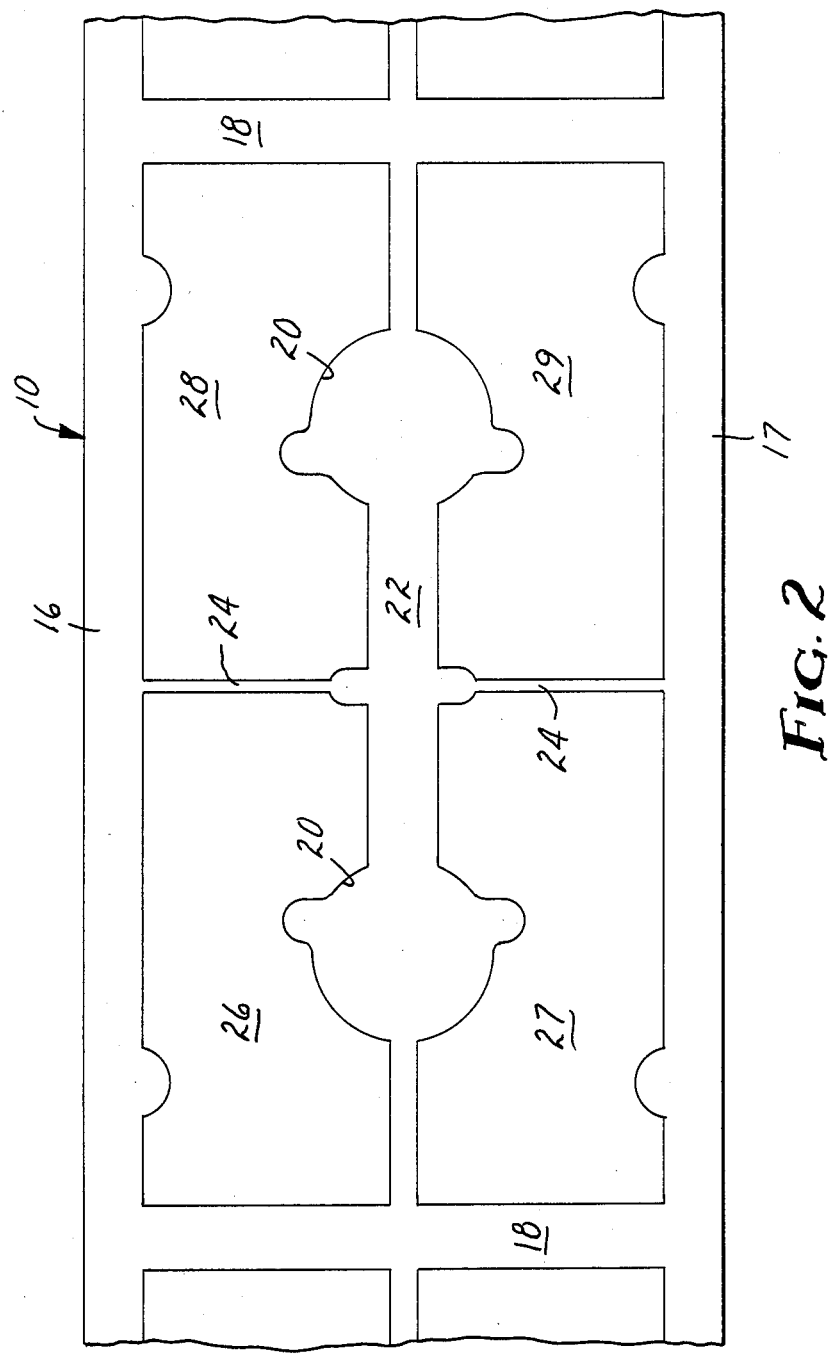

MAGNETIC RECORDING DISKETTE WITH OFFSET WIPING FABRIC

FIELD OF THE INVENTION

The invention concerns a magnetic recording diskette which comprises a flexible magnetic recording disk contained in a jacket to which is attached a wiping fabric. A typical diskette is disclosed in U.S. Pat. No. 3,668,658 (Flores et al.).

BACKGROUND ART

The above-cited Flores patent concerns a special wiping fabric which it calls a dusting fabric. A more widely used wiping fabric, as described in U.S. Pat. No. 4,239,828 (Knope et al.), is a nonwoven, porous, tissue-like material made from 80 parts of rayon fibers and 20 parts by weight of polypropylene fibers, both of approximately 1.5 denier and having been fused together to afford integrity to the fabric, e.g., "Novonette" No. H854 of the Kendall Co. The Knope patent reports that the fabric was cut to shape and attached to the envelope or jacket material by a single pass of a roll having knurled sections of about 3 mm in width which had been preheated to 175° C. The envelope material was a film of a copolymer of 90 parts of vinyl chloride and 10 parts by weight of vinyl acetate containing about 10% carbon particles and having a matte surface. The temperature of the knurl roll was sufficient to fuse the fabric to the vinyl film without observable change in the overall porosity of the fabric.

Although the Knope patent reports cutting the fabric to shape before thus bonding it to the vinyl film, it is believed that almost all diskettes have been made by bonding uncut fabric to uncut vinyl film and then die-cutting the composite to form a jacket blank having a number of openings including a pair of data transfer slots. See U.S. Pat. No. 4,263,634 (Chenoweth et al.), col. 1, lines 28-42 which states: "This resulted in the edges of the fabric being coincident with the edges of the slots and resulted also in fibers from the fabric migrating or extending from the fabric into the slots on disk rotation thus causing unreliable data transfer by the transducers extending through the slots into contact with the disk. These trouble causing fibers in the data transfer slots of the jacket occurred particularly when overused dulled punches were used, resulting in undue fraying of the fabric." The Chenoweth patent answered this problem as follows: "(A) pair of panels of porous dusting fabric are disposed on each of the two inside surfaces of a flexible magnetic disk receiving jacket. These panels are spaced by gaps which are wider than the jacket slots and in which the jacket slots are disposed, and the edges of the fabric panels are thus out of register with the edges of the jacket slots. These edges of the panels are formed by edge sharpened slitter wheels, so that these edges are cut rather than the result of tearing, and so that the dusting fabric edges have a minimum number of frayed and free fibers that might lodge beneath a transducer in data transferring contact with the disk." (col. 1, lines 52-64).

Even though the dusting or wiping fabric of the Chenoweth diskette is out of registry with the edges of the data transfer slots of the jacket, other edges of the fabric coincide with edges of other jacket openings including the central openings and timing holes. Not only do these edges afford the hazard of loose fibers, but some diskette users consider that the sight of loose fibers at any jacket opening is a sign of poor quality. To avoid this, the punch or die must be exceedingly sharp. Usually such a die cannot be resharpened more than three times without going out of specifications.

DISCLOSURE OF INVENTION

The invention concerns a recording diskette in which, like that of Chenoweth, the wiping fabric edges that the data transfer slots of the jacket (1) can be cut rather than the punched or torn, and (2) are out of registry with the edges of the data transfer slots. In the diskette of the invention, unlike that of Chenoweth, the wiping fabric edges that encircle every opening in the jacket are out of registry with the edges of those openings, and all of those edges can be cut rather than punched or torn. This avoids the hazard of loose fibers and also provides an assurance of quality, because fibers are less likely to contaminate the diskette or recorder. Furthermore, there are some surprising results. First, a die with which the jacket is cut remains usefully sharp for at least twice as long as it would if used to die-cut a composite of the jacket material and fabric. Second, although punched-out pieces of jacket material have, in the prior art, been contaminated by fabric, they are not contaminated in present invention and thus can be reused as scrap. Also, diskettes can be formed in accordance With the invention in a fast, economical manner using apparatus that is no more expensive or complicated than equipment used in the prior art.

Diskettes of the invention have a jacket formed with openings including aligned central openings, aligned data transfer slots, and aligned timing holes and can be made by the steps of (a) continuously cutting a roll of wiping fabric to form apertures corresponding to and greater than said jacket openings;

(b) continuously laminating to a roll of jacket material portions of the cut wiping fabric that lie outside of said apertures;

(c) continuously removing portions of the cut wiping fabric that lie inside said apertures;

(d) forming jacket blanks and openings in the jacket blanks out of registry with the edges of said apertures; and (e) folding and sealing each jacket blank around a flexible magnetic recording disk to provide a magnetic recording diskette.

Preferably the roll of wiping fabric is sufficiently wide that in step a) a continuous weed is formed at each side, the weeds being interconnected by strips which extend across the jacket material where the ends of the jacket blanks are to be formed. Preferably, the wiping fabric is so cut that a single aperture encompasses all of the central openings, data transfer slots, and timing holes of one jacket blank, and the material inside each aperture forms a single ribbon interconnecting adjacent strips. This permits all fabric material within the apertures to be carried off in step (c) by carrying off the weeds and interconnecting strips.

Currently the jacket blank of most diskettes is formed with aligned write-enable notches at one or both edges. Preferably during step a), half-apertures are cut at one or both edges of the wiping fabric panel, which half-apertures are larger than the write-enable notches. The portions of the fabric within said half-apertures should be interconnected with one of the weeds in order to be carried off with the weeds and their interconnecting strips.

Preferably the edges of the fabric panels are set back sufficiently from the edges of the jacket openings that in a finished diskette, the fabric is hidden from sight. This not only eliminates loose fibers, but also provides an aesthetically pleasing appearance. To allow reasonable manufacturing tolerances while ensuring that the fabric is hidden from sight, the wiping fabric at each of its apertures is preferably set back at least one mm from the edge of each jacket opening that is formed in step (d). On the other hand, the spacing between the edges of the fabric panel and the edges of the jacket openings should not exceed 5 mm and preferably is less than 3 mm. Otherwise there would be a hazard that the flexible magnetic recording disk might not be wiped adequately by the wiping fabric.

Preferably, each aperture formed in fabric roll also forms a channel extending along the line at which the jacket blank is centrally folded to form an envelope for a recording disk, and the fabric material within the channel preferably interconnects the two weeds. By eliminating fabric at the central jacket fold, surprisingly lower temperature has been necessary to form the fold. The use of a lower folding temperature has eliminated distortions in the jacket at the central folds, whereas distortions in some prior diskettes not only have been aesthetically distracting but may have contributed to failures in performance.

It has been found that a spacing of about 5 mm between the fabric panels at the fold permits the formation of distortion-free folds. At less than about 3 mm, the fabric at the fold might absorb heat to the extent that an undesirably high temperature might be required to form the fold. At more than about 20 mm, the recording disk of the periphery of a finished diskette might not be wiped adequately by the wiping fabric.

THE DRAWING

The invention may be better understood with reference to the drawing in which:

FIG. 1 schematically illustrates apparatus for making a diskette jacket in accordance with the invention;

FIG. 2 shows a pattern of wiping fabric which has been cut by the rotary die cutter of FIG. 1;

Figure 1:
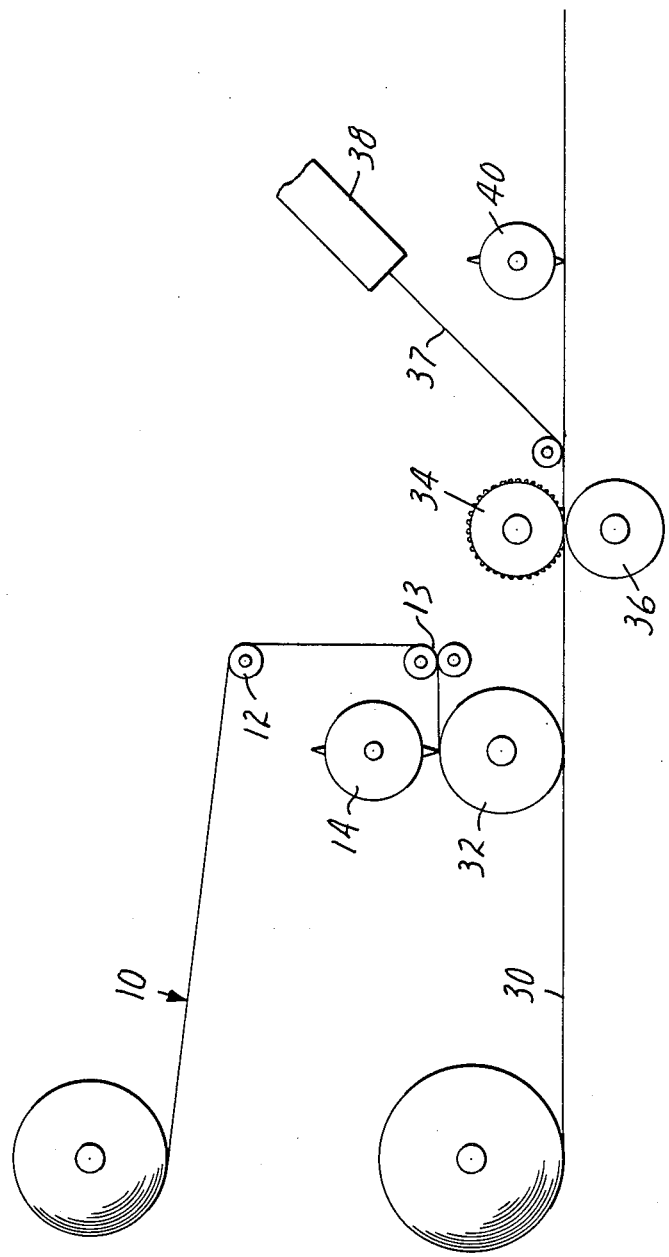

In FIG. 1, a roll of wiping fabric 10 is fed past an idler 12 and a pressure-nip 13 to a rotary die cutter 14 where it is continuously cut to form the pattern illustrated in FIG. 2. Along the edges of the pattern are weeds 16,17 which are interconnected by a series of strips 18. Between each adjacent pair of strips is a central aperture 20 at which a ribbon 22 of fabric interconnects the strips. Each aperture 20 also forms a narrow gap within which a length 24 of fabric interconnects the ribbon 22 and the two weeds 16,17. In areas between each aperture 20 and the weeds are four fabric panels 26,27,28,29 which are to be bonded to jacket material 30 seen in FIG. 1 being unwound from a roll.

Figures 3, 4:
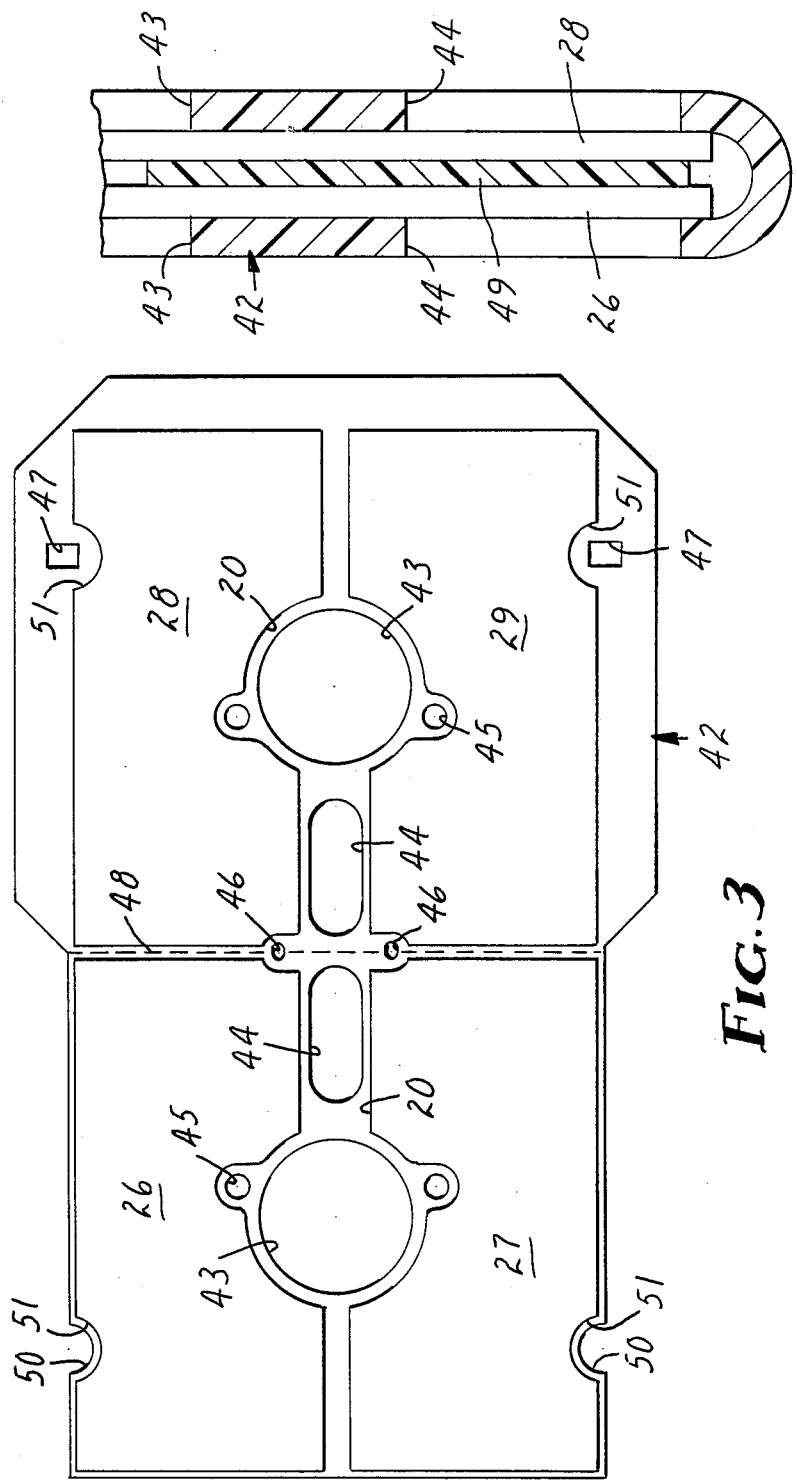
FIG. 3 shows a jacket blank to which fabric panels of the pattern of FIG. 2 have been bonded in the apparatus of FIG. 1.
FIG. 4 is an enlarged fragmentary schematic central section through the central fold of a diskette formed from the composite of FIG. 3.

The cut wiping fabric is carried around a vacuum transfer roll 32 and then is carried with the jacket material 30 between a heated laminating roll 34 and a compliant roll 36. This continuously bonds the fabric panels 26, 27, 28, 29 to the jacket material 30, after which the unbonded portions 37 of the fabric (i.e., weeds 16,17, strips 18, ribbon 22, and lengths 24) are continuously fed as scrap to a suction station 38. The laminate of fabric panels 26, 27, 28, 29 and jacket material is then carried to a die-cutter 40 which cuts out jacket blanks 42 as illustrated in FIG. 3.

Each jacket lank 42 is formed at the die-cutter 40 to create two central openings 43, two data transfer slots 44, four timing holes 45, two stress-relief perforations 46, and two write-enable notches 47, all of which are carried away as scrap by means not shown. Each jacket blank is then folded along a central dashed line 48 extending through the stress-relief perforations 46 along the gap between fabric panels 26 and 28 and between fabric panels 27 and 29. After inserting a magnetic recording disk 49 (FIG. 4), the edges of the jacket blank are folded and sealed together in accordance with the prior art to provide a magnetic recording diskette.

As is known in the art, the stress-relief perforations 46 function to cause any bending of the diskette at the fold to occur at one or both of those perforations and not in the area of the fold adjacent the data transfer slots 44. As is also known in the art, indentations 50 in the edges of the jacket blank 42 allow the write-enable notches 47 to be unobstructed after forming the diskette. The wiping fabric should have half-apertures 51 to be out of registry with the indentations 50 and the notches 47 as shown in FIG. 3, thus ensuring that the fabric is out of registry with the write-enable notches 47 of the finished diskette.

Figure 5:
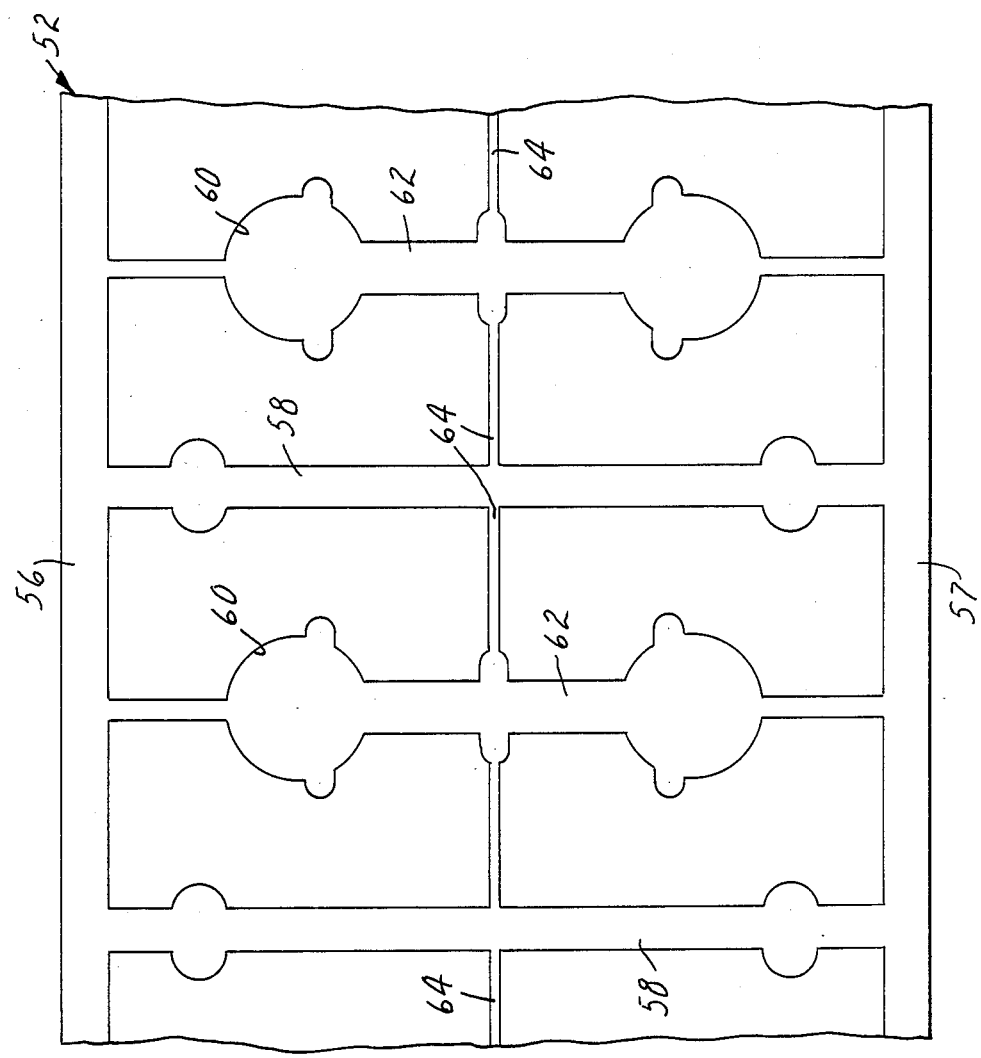
FIG. 5 shows wiping fabric which has been cut to form another pattern in the practice of the invention.

The wiping fabric 52 shown in FIG. 5 has been cut from a single roll to fit jacket blanks which are to be punched out from a roll with their lengths extending crosswise of the roll. To be discarded as scrap are weeds 56,57, interconnecting strips 58, ribbons 62 (in central apertures 60), and narrow lengths 64 interconnecting the ribbons 62 and the strips 58.

EXAMPLE 1

So-called 5¼ inch diskettes have been made using a vinyl jacket material and nonwoven tissue as the wiping fabric. The vinyl material comprised a homopolymer of vinyl chloride and had a thickness of about 4 micrometers. The fabric had a thickness of about 3 micrometers and comprised about 90 parts of polyester fibers and about 10 parts by weight of a lower-melting fiber to lend integrity to the fabric. Using apparatus substantially as illustrated in FIG. 1 of the drawing, the fabric was cut to the pattern illustrated in FIG. 2, after which the fabric panels 26,27,28,29 were laminated to the vinyl material by being pressed with a heated roll, from the surface of which projected cylindrical metal pins, each 8 micrometers in diameter and spaced from adjacent pins on 30-micrometer centers. The pins were located to laminate only the fabric panels to the jacket material, and their temperature was maintained between 220° and 260° C. The spacing across the gap between the fabric panels 26 and 27 and between the fabric panels 28 and 29 was about 5 mm.

After the laminating step, the jacket material was die-cut to provide a number of jacket blanks and their openings as illustrated in FIG. 3 of the drawing, leaving a spacing of about 2 mm between each jacket opening and the edges of the fabric panels. It was estimated that the die could punch out about 4 million jacket blanks before needing resharpening. In contrast, when the same jacket and fabric materials have been laminated and die-cut together, it has been necessary to resharpen the die after about 2 million cycles.

Laminated jacket blanks of this example were folded along the dashed line 48 of FIG. 3 while heating the vinyl material at the fold to about 90° C. The resulting folds were free from any visible defect and were adjudged to be superior in appearance to folds made with the same jacket and fabric materials where the fabric covered the folded area. It was further adjudged that the periphery of the recording disk of each diskette would not extend beyond the wiping fabric in any diskette recording mechanism in current widespread use.

I claim:

1. Diskette comprising wiping fabric panels laminated to the interior face of a jacket formed from a jacket blank which has been folded along a central line to cover both sides of a magnetic recording disk, wherein the improvement comprises:

the edge of each of said fabric panels proximate said central line are spaced from the central line along which the jacket blank is folded.

2. Diskette as defined in claim 1 wherein the distance between the edges of the fabric panels proximate said central line measured along the interior face of the jacket is from 3 to 20 mm.

3. Diskette as defined in claim 2 wherein said distance between edges is about 5 mm.

* * * * *

UNITED STATES PATENT AND TRADEMARK OFFICE
CERTIFICATE OF CORRECTION

PATENT NO. : 4,839,765

DATED : June 13, 1989

INVENTOR(S) : Hung Q. Lam

It is certified that error appears in the above-identified patent and that said Letters Patent is hereby corrected as shown below:

Column 2, line 9, after "that" insert --encircle--;

Column 2, line 28, "With" should be --with--;

Column 4, line 10, "lank" should be --blank--.

Claims 1-3 should be deleted to appear as per attached sheet.

Signed and Sealed this

Twentieth Day of March, 1990

Attest:

JEFFREY M. SAMUELS

Attesting Officer

Acting Commissioner of Patents and Trademarks

UNITED STATES PATENT AND TRADEMARK OFFICE
CERTIFICATE OF CORRECTION

PATENT NO. : 4,839,765

DATED : June 13, 1989

INVENTOR(S) : Hung Q. Lam

It is certified that error appears in the above-identified patent and that said Letters Patent is hereby corrected as shown below:

"1. Diskette comprising a jacket formed from a jacket blank comprising a flat, generally rectangular jacket panel which has been folded along a transverse, central line to cover both sides of a magnetic recording disk, said jacket panel having wiping fabric panels laminated to the surfaces of said jacket panel facing said magnetic recording disk and wherein the improvement comprises:

each of said fabric panels proximate said central line is spaced from said central line along which said jacket blank is folded.

2. Diskette as defined in claim 1 wherein the distance between said central line and the fabric panels proximate said central line measured along said facing surface of said jacket panel is from 3 to 20 mm.

3. Diskette as defined in claim 2 wherein said distance is about 5 mm."